United States Patent

Pasko

(10) Patent No.: US 8,385,224 B2
(45) Date of Patent: Feb. 26, 2013

(54) SHARED WI-FI / WIRELESS BROADBAND ACCESS

(75) Inventor: Douglas M. Pasko, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 338 days.

(21) Appl. No.: 12/888,604

(22) Filed: Sep. 23, 2010

(65) Prior Publication Data

US 2012/0076009 A1 Mar. 29, 2012

(51) Int. Cl.
*H04L 12/28* (2006.01)
*H04L 1/00* (2006.01)
*H04W 4/00* (2009.01)

(52) U.S. Cl. ........ 370/252; 370/329; 370/338; 370/341; 370/431

(58) Field of Classification Search .................. None
See application file for complete search history.

(56) References Cited

U.S. PATENT DOCUMENTS

| | | | |
|---|---|---|---|
| 2005/0177618 A1* | 8/2005 | Zimler et al. | 709/203 |
| 2007/0064594 A1* | 3/2007 | Norton | 370/218 |
| 2007/0276925 A1* | 11/2007 | La Joie et al. | 709/219 |
| 2009/0044242 A1* | 2/2009 | Ramakrishnan et al. | 725/118 |
| 2009/0129405 A1* | 5/2009 | Lauwers et al. | 370/468 |
| 2009/0180430 A1* | 7/2009 | Fadell | 370/329 |
| 2010/0190518 A1* | 7/2010 | Lindner et al. | 455/518 |
| 2011/0287794 A1* | 11/2011 | Koskela et al. | 455/509 |

* cited by examiner

*Primary Examiner* — Chi Pham
*Assistant Examiner* — Soon-Dong D Hyun

(57) ABSTRACT

A subscriber device detects a potential node for providing supplemental bandwidth to the subscriber device. The subscriber device sends, to a control server, an indication of the potential node. The subscriber device requests, via a primary data path, data from a content server and detects high bandwidth usage of the primary data path. The subscriber device sends, to the control server and based on the detected high bandwidth usage, a request for supplemental bandwidth. The subscriber device receives a portion of the data via the primary data path and another portion of the data from the potential node via a secondary data path that differs from the primary data path.

22 Claims, 9 Drawing Sheets

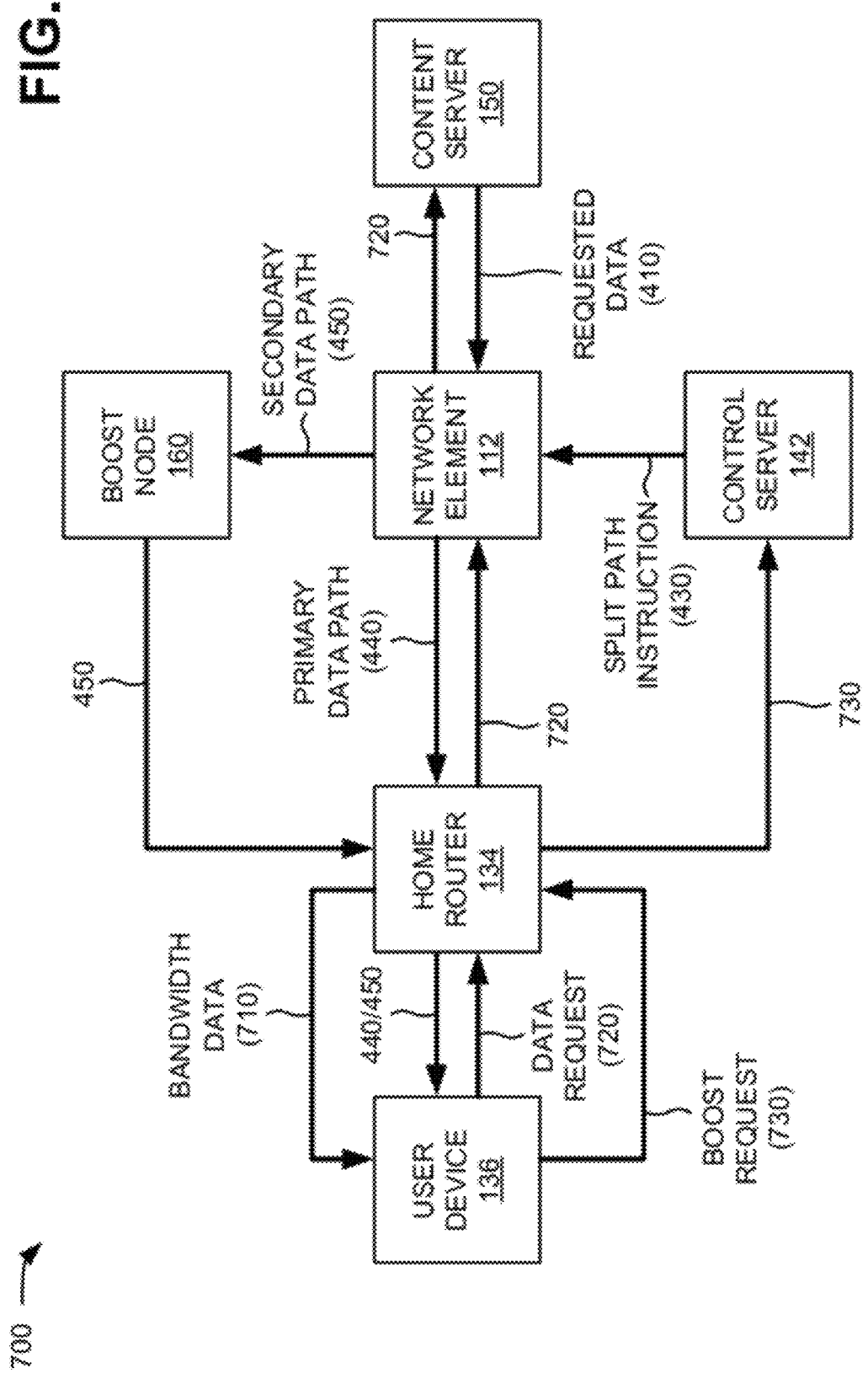

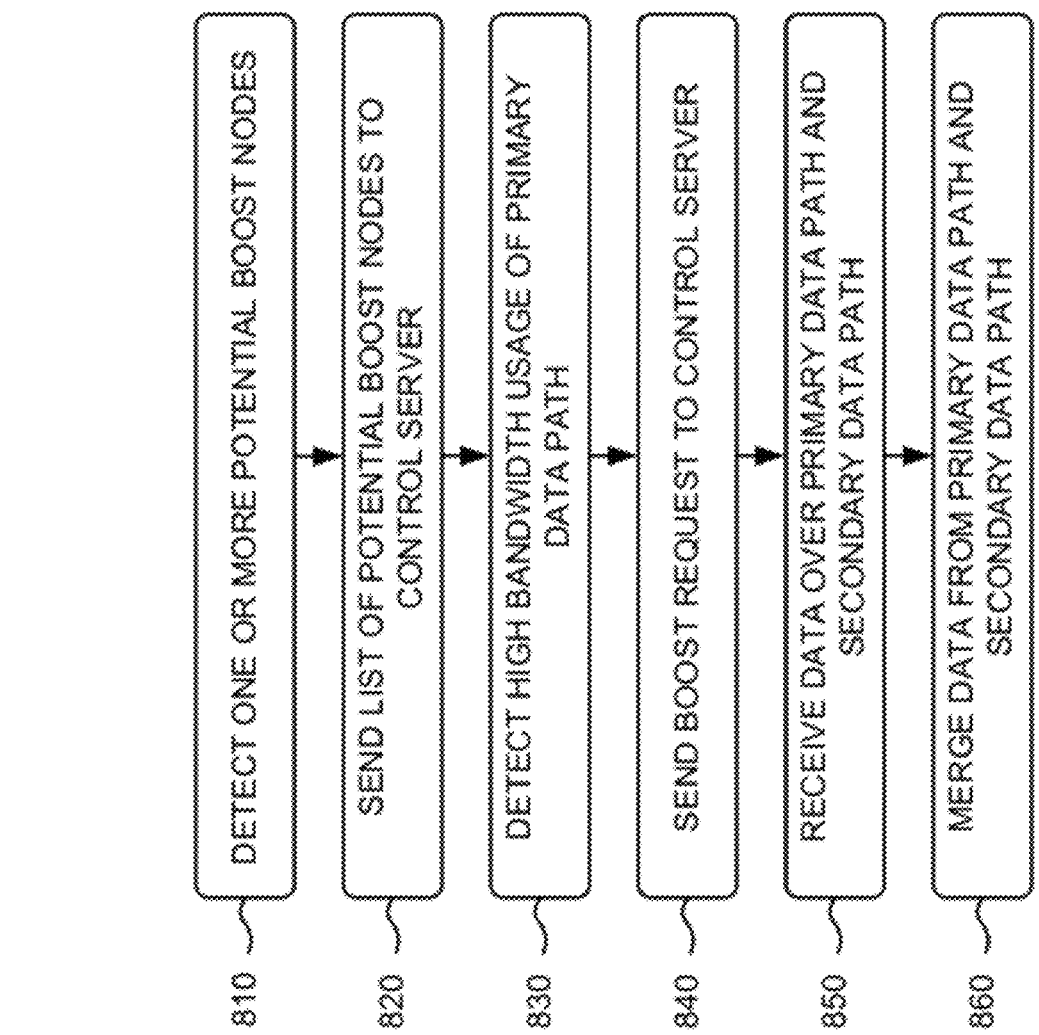

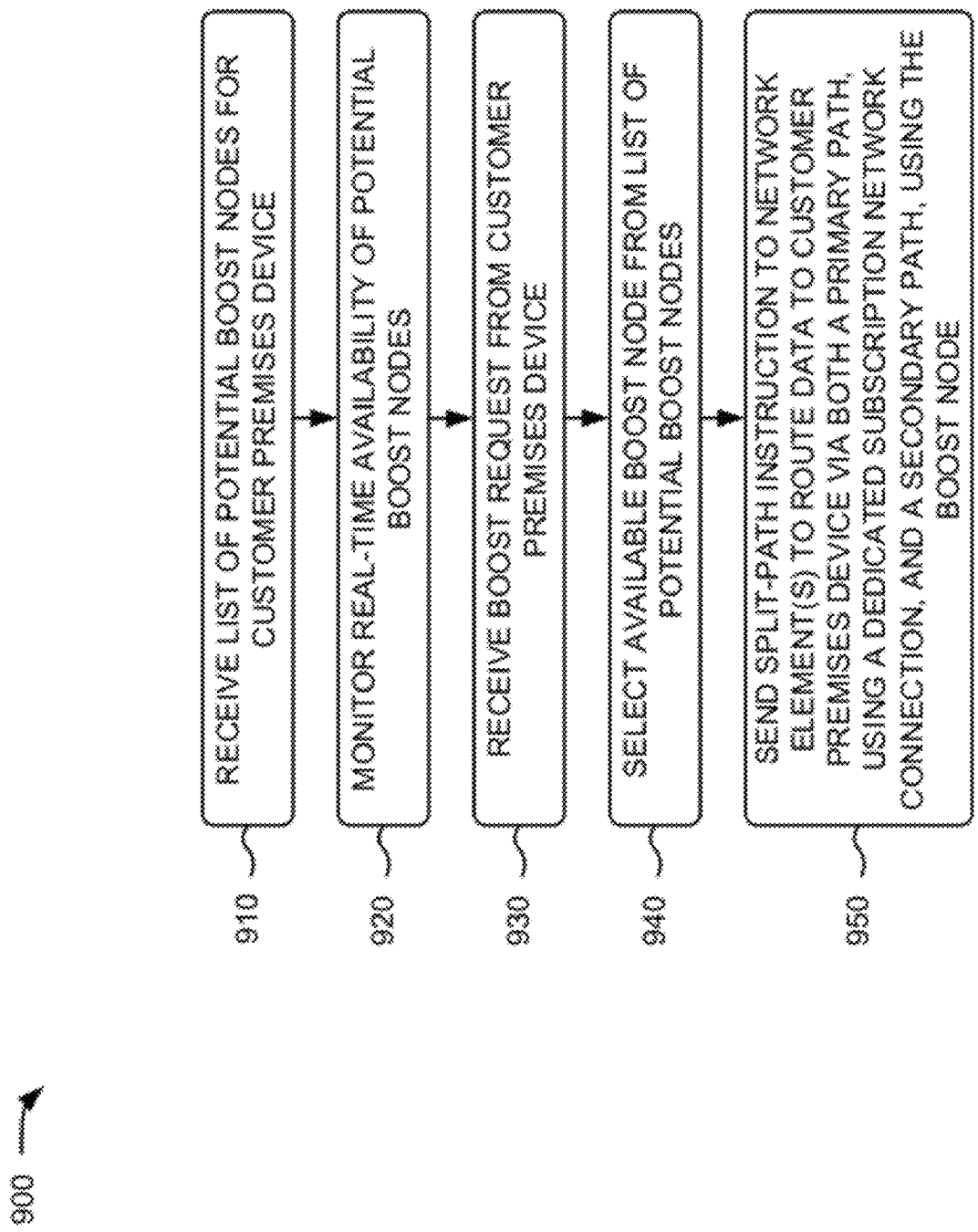

SHARED WI-FI / WIRELESS BROADBAND ACCESS

BACKGROUND

As high speed network access becomes increasingly accessible, more and more bandwidth-intensive applications are being made available to customers. Digital Subscriber Line (DSL) is a technology for bringing high-bandwidth digital information to homes and businesses over telephone lines. A DSL line can simultaneously carry both data and voice signals. The data portion of the line may be continuously available to the user, making DSL an "always-on" connection. Special digital hardware attached to both ends of the line allows data transmission over the wires at relatively high bandwidths.

Other wired or wireless services may provide high speed wireless or wireline broadband access using wireless broadband equipment, optical cables, copper cables, and/or other fixed wired or wireless technologies. While DSL or broadband services may provide adequate bandwidth for many applications, these services may not provide optimal performance for some bandwidth-intensive applications.

BRIEF DESCRIPTION OF THE DRAWINGS

FIG. 7 is a diagram of example operations capable of being performed by another example network portion of the environment depicted in FIG. 1;

FIG. 8 is a flow chart of an example process for providing supplemental bandwidth for a dedicated network connection according to implementations described herein; and FIG. 9 is a flow chart of another example process for providing supplemental bandwidth for a dedicated network connection according to implementations described herein.

DETAILED DESCRIPTION OF PREFERRED EMBODIMENTS

Figure 1:
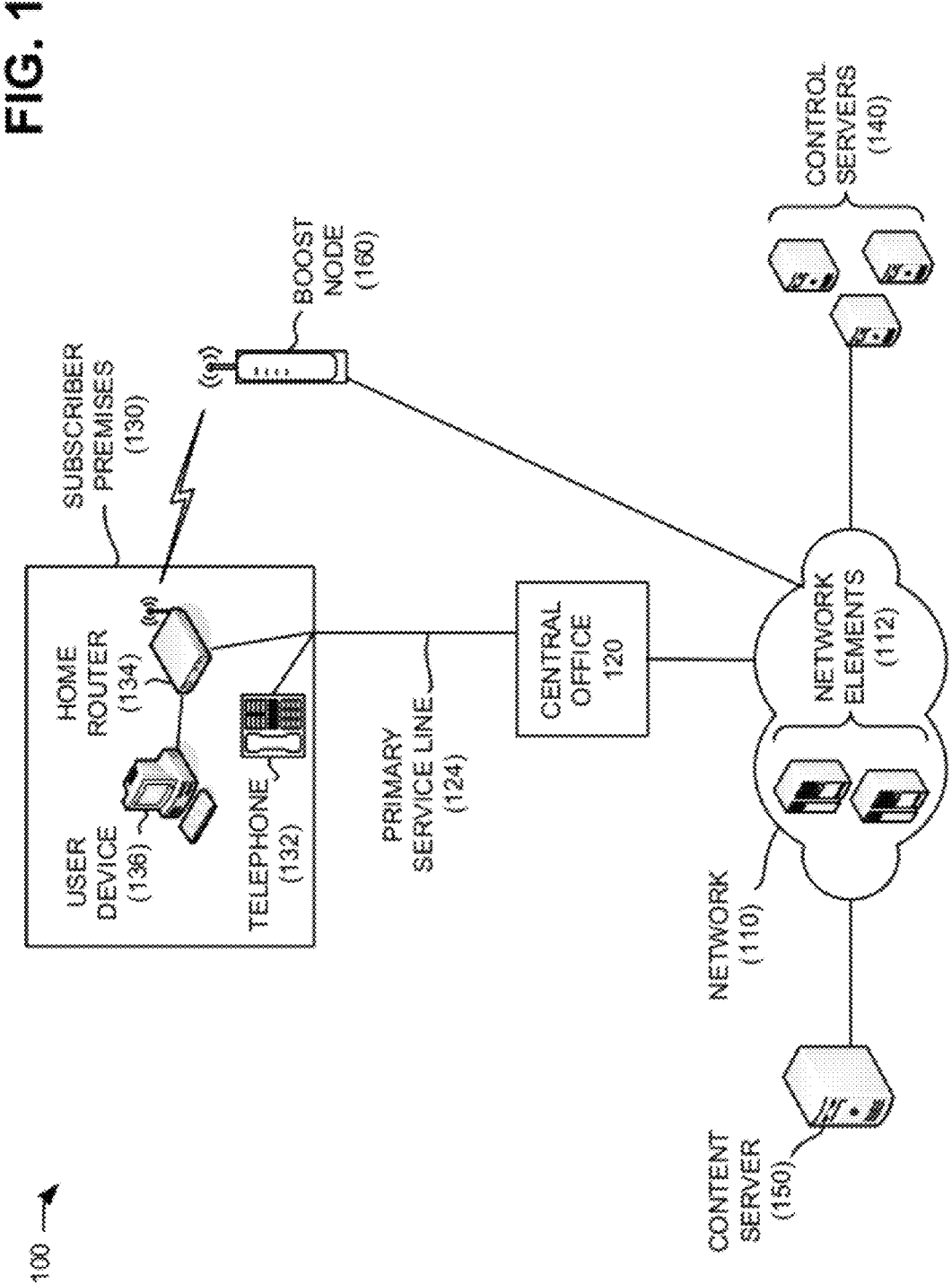
FIG. 1 is a diagram of an example network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may enable subscribers with limited bandwidth capacity from a primary data path, such as a DSL or broadband connection, to receive temporary supplemental bandwidth from another network node (e.g., a "boost node"), such a wireless access point. In implementations described herein, equipment on the subscriber's premises may detect potential boost nodes and use the subscriber's primary data path to request and/or facilitate out-of-frame data transfer using the supplemental bandwidth from the boost node via a secondary data path, such as a wireless network connection. A remote server (e.g., a "control server") may direct traffic flows between the primary data path and the secondary data path.

In one implementation, a subscriber device may detect one or more potential boost nodes for providing supplemental bandwidth, in addition to the subscriber's primary data path. The subscriber device may send, to a control server, a list of the one or more potential boost nodes, and the control server may monitor availability of the potential boost nodes. Additionally, the subscriber device may request/receive data from a content server (e.g., data sufficient to increases bandwidth usage on the primary data path to a high level). Based on the increased bandwidth usage, the subscriber device may send, to the control server, a boost request for supplemental bandwidth. In response to the boost request, the control server may select an available boost node for the subscriber device (e.g., from the list of potential boost nodes), and may send, to a network device, split-path instructions. The split-path instructions may include instructions to route a portion of data from the content server to the subscriber device via a primary data path associated with the subscriber device, and instructions to route a different portion of the data from the content server to the subscriber device via the selected available boost node. The subscriber device may receive and combine the two data portions for presentation to a user.

As used herein, the terms "customer," "subscriber," and/or "user" may be used interchangeably and are intended to be broadly interpreted to include a user device (e.g., a mobile telephone, a personal computer, etc.) or a user of a user device. Also, the term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

While systems and/or methods are described herein primarily in the context of boosting DSL services, in other implementations, the systems and/or methods described here may be applied to boost other network provider services, such as broadband services using copper cable, fiber optic, or wireless network equipment.

FIG. 1 is a diagram of an example environment 100 in which systems and/or methods described herein may be implemented. As illustrated, environment 100 may include a network 110, a central office 120, subscriber premises 130, control servers 140, a content server 150, and a boost node 160. Components of environment 100 may interconnect via wired and/or wireless connections. A single network 110, central office 120, subscriber premises 130, content server 150, and boost node 160 and multiple control servers 140 have been illustrated in FIG. 1 for simplicity. In practice, there may be more networks 110, central offices 120, subscriber premises 130, control servers 140, data servers 150, and/or boost nodes 160. Also, in some instances, one or more of the components of environment 100 may perform one or more functions described as being performed by another one or more of the components of environment 100.

Network 110 may include a Local Area Network (LAN), a wide area network (WAN), such as a cellular network, a satellite network, a broadcast television based network, the Internet, a private WAN, or a combination of the Internet and a private WAN, that is used to transport data. Network 110 may include a number of separate networks that function to provide services to subscriber premises 130. In one implementation, network 110 may be a network that provides voice and data services for subscriber premises 130. Network 110 may include a high capacity data backbone associated with the service provider. For instance, network 110 may include a circuit-switched telephone network and a packet-based data network. Network 110 may also include a wireless access network. Network 110 may be connected, through central office 120 and/or boost node 160, to subscriber premises 130.

Network 110 may include a number of network elements 112. Each of network elements 112 may include a data transfer device, such as a gateway, a router, a switch (e.g., an asynchronous transfer mode (ATM) switch), a firewall, a network interface card (NIC), a hub, a bridge, a proxy server, an optical add-drop multiplexer (OADM), a line access multiplexer (LAM), a permanent or private virtual circuit (PVC), links provided between any of the aforementioned devices, or some other type of device that processes and/or transfers data. In one example, one or more network elements 112 may be capable of establishing an end-to-end path between subscriber premises 130 and content server 150.

Central office 120 may represent a physical location, generally controlled by the service provider, through which subscriber premises 130 connect to network 110. Central office 120 may particularly include one or more devices to aggregate communication from multiple subscriber premises. For example, central office 120 may include a digital subscriber line access multiplexer (DSLAM) to connect multiple lines (i.e., primary service lines 124 from multiple subscriber premises 130 using DSL) to network 110. Depending on its device architecture and setup, central office 120 may aggregate primary service lines 124 over Asynchronous Transfer Mode (ATM), frame relay, and/or an Internet Protocol network. The aggregated traffic may then be directed to network 110, possibly by transmitting the data through an access network (AN).

Subscriber premises 130 may represent a subscriber to the service offered by the service provider (e.g., via control servers 140). Subscriber premises 130 may connect to central office 120 through primary service line 124. Subscriber premises 130 may include, for example, one or more telephones 132, a home router 134, and one or more user devices 136. Telephones 132, home router 134, and user devices 136 may be referred to individually and/or generically as "customer premises equipment" or as a "subscriber device." Telephone 132 may include a conventional analog phone through which a user may place and receive calls.

Home router 134 may include a device that may provide connectivity between network 110 and one or more components of subscriber premises 130 (e.g., user devices 136). Home router may provide a data connection to user devices 136 via, for example, an Ethernet, a Universal Serial Bus (USB), and/or a wireless connection. Home router 134 may receive information from network 110 for transmission with subscriber premises 130, and/or receive information from within subscriber premises 130 for transmission on network 110. Home router 134 may also provide firewall functionality for subscriber premises 130, such as packet filtering and protection against network attacks.

In one implementation, home router 134 may include a DSL modem to modulate high frequency tones for transmission to central office 120 (e.g., a DSLAM). The DSL modem may correspondingly receive and demodulate signals from central office 120. In some cases, home router 134 may be supplied by the service provider as customer premises equipment (CPE). In implementations described herein, home router 134 may be configured to simultaneously participate in multiple wireless networks. Home router 134 is described further in connection with, for example, FIG. 5.

User device 136 may include a computing or communication device, such as a personal computer, a laptop computer, a Voice over IP (VoIP) device, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a gaming system, or another device. Multiple user devices 136 at a single subscriber premise may connect to home router 134, either directly or through a local switching or routing device. In some implementations, user device 136 may include multiple forms of network connectivity, such as an Ethernet connection, wireless LAN equipment, a wireless broadband card, etc. In an implementation, user device 136 may detect high bandwidth demands and initiate a request for supplemental bandwidth.

Control servers 140 may include computing devices that provide control plane functionality to direct data flows to subscriber premises 130 (e.g., user devices 136). For example, as described further herein, control servers 140 may receive a request, from subscriber premises 130, for additional network bandwidth and direct a supplemental data flow to subscriber premises 130 via boost node 160. In one implementation, control server 140 may be associated with a service provider that provides primary network connectivity (e.g., DSL, broadband, etc.) to subscriber premises 130. In another implementation, control server 140 may be associated with a third party (e.g., that provides an overlay service for the primary service provider). Control server 140 is described further in connection with, for example, FIG. 6.

Content server 150 may include one or more server devices, or other types of computation or communication devices, that gather, process, search, and/or provide information in a manner described herein. In one implementation, content server 150 may include a computer system, an application, and/or a broadcasting device. Content server 150 may include IP content distribution facilities (e.g., IPTV), telephone communication facilities (e.g., VoIP, video telephony, etc.), etc. Examples of content server 150 may include a web server, session initiation protocol (SIP) messaging server, a video voicemail server, etc. In one implementation, content server 150 may provide multimedia content that can be presented to a user on user device 136.

Boost node 160 may include any hardware device or combination of hardware and software, such as an Institute of Electrical and Electronics Engineers (IEEE) 802.11a, b, g, or n router (e.g., a WiFi router), a wireless access point, a wireless adapter, a base station, etc., that acts as a communication hub for connecting home router 134 and/or user device 136 to network 110 (e.g., via a different network path than primary service line 124). Boost node 160 may be provided in a variety of forms. For example, boost node 160 may be a dedicated device installed (e.g., by the service provider) in a regional service area (e.g., a neighborhood, apartment complex, etc.) to support multiple subscriber premises 130. In another implementation, boost node 160 may be another home router in a different subscriber premises. In still another implementation, boost note 160 may be a base station for a wireless broadband service.

Boost node 160 may connect to network 110 via wired or wireless connections. For example, boost node 160 may use a separate digital subscriber line, cable/fiber, or a satellite connection to provide access to network 110. In another implementation, boost node 160 may be a broadband device (e.g., a fixed or portable broadband device) that may receive wireless broadband signals, such as Long Term Evolution (LTE) network signals or Evolution-Data Optimized (EVDO) network signals.

In one implementation, boost node 160 may define a wireless network within a specific geographic area (or "hotspot")

that provides customer premises equipment with access to network 110. For example, boost node 160 may provide a one-way (e.g., downlink) path to home router 134. Boost node 160 may, for example, broadcast encrypted signals that may be received by home router 134 and decrypted based on a decryption key provided via central office 120 and primary service line 124. In another implementation, a wireless network (e.g., established using the 802.11x family of networking protocols) may be identified by a service set identifier (SSID). Selection of a network SSID from a selection of available SSIDs may enable home router 134 to connect to the wireless network of boost node 160 (e.g., via suitable authentication and account login procedures) to establish two-way (e.g., downlink and uplink) communications. Once home router 134 is connected to the wireless network, a content server 150 may provide content to user device 136 via network 110 and boost node 160.

In another implementation, a wireless network may be established between user device 136 and boost node 160 using LTE or EVDO protocols. For example, user device 136 may concurrently receive signals (e.g., from home router 134) using a primary network connection to subscriber premises 130 and signals (from boost node 160) using a wireless broadband connection.

In implementations herein, home router 134 or user device 136 may detect high a bandwidth demand to support a data transfer from content server 150. Home router 134 or user device 136 may request, from control servers 140, additional bandwidth resources. Control servers 140 may identify an available boost node 160 for home router 134 (or user device 136) and direct that the data flow from content server 150 to user device 136 be divided between central office 120 and boost node 160. The use of boost node 160 may provide addition bandwidth to supplement a primary data flow through central office 120.

Although FIG. 1 shows example components of environment 100, in other implementations, environment 100 may include fewer components, different components, differently arranged components, or additional components than depicted in FIG. 1.

Figure 2:
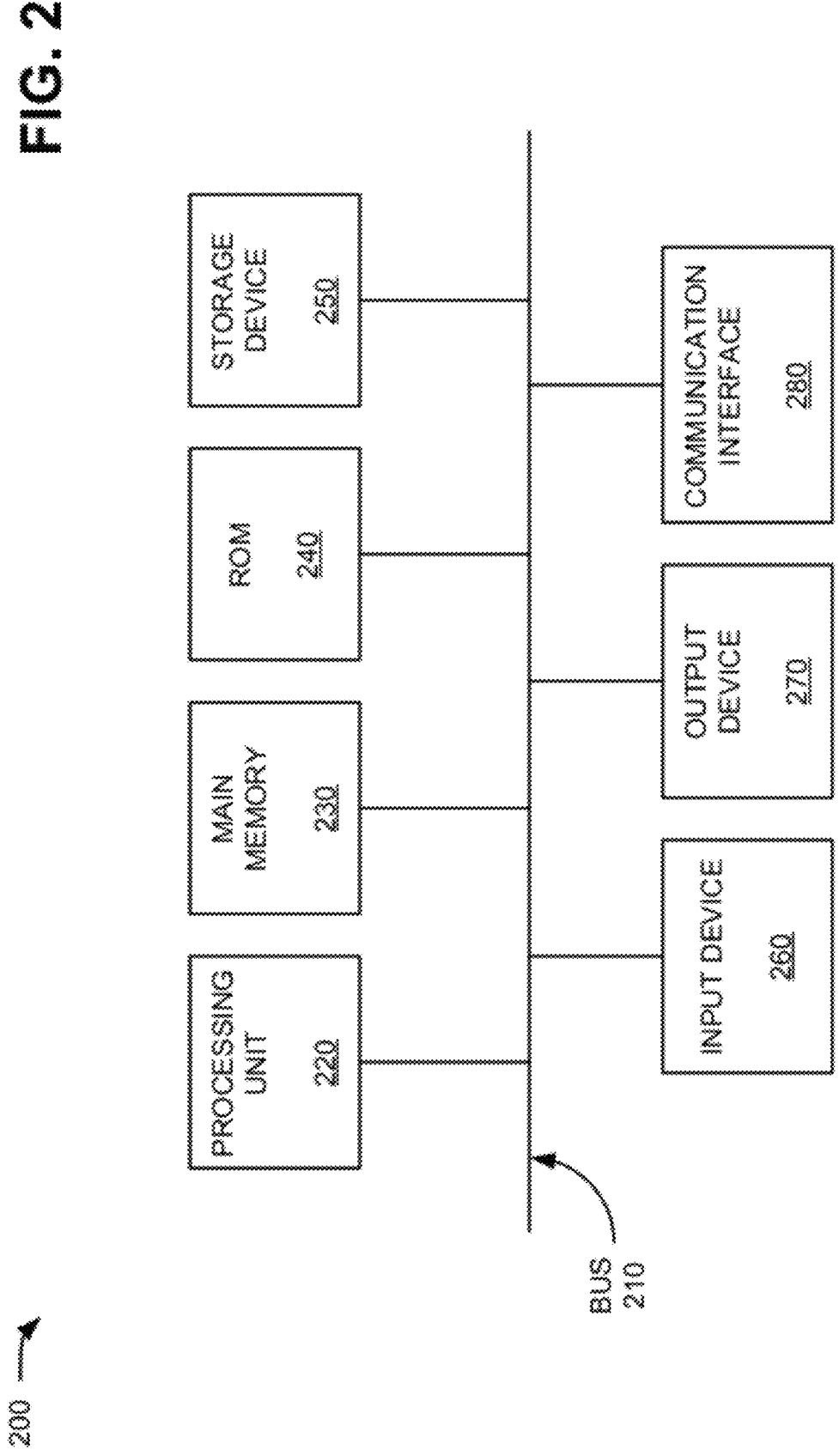
FIG. 2 is a diagram of example components of one or more of the devices of the network depicted in FIG. 1.

FIG. 2 is a block diagram of an example computing device 200, which may correspond to one or more of home router 134, user device 136, control server 140, or content server 150. As illustrated, computing device 200 may include a bus 210, a processing unit 220, a main memory 230, a read only memory (ROM) 240, a storage device 250, an input device 260, an output device 270, and a communication interface 280. Bus 210 may include a path that permits communication among the elements of computing device 200.

Processing unit 220 may include one or more processors, microprocessors, and/or other types of processing devices that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to computing device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 110. In implementations in which computing device 200 represents a server (e.g., one of control servers 140), input device 260 and output device 270 may not be used. That is, the server may be a "headless" computing device.

As described herein, computing device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
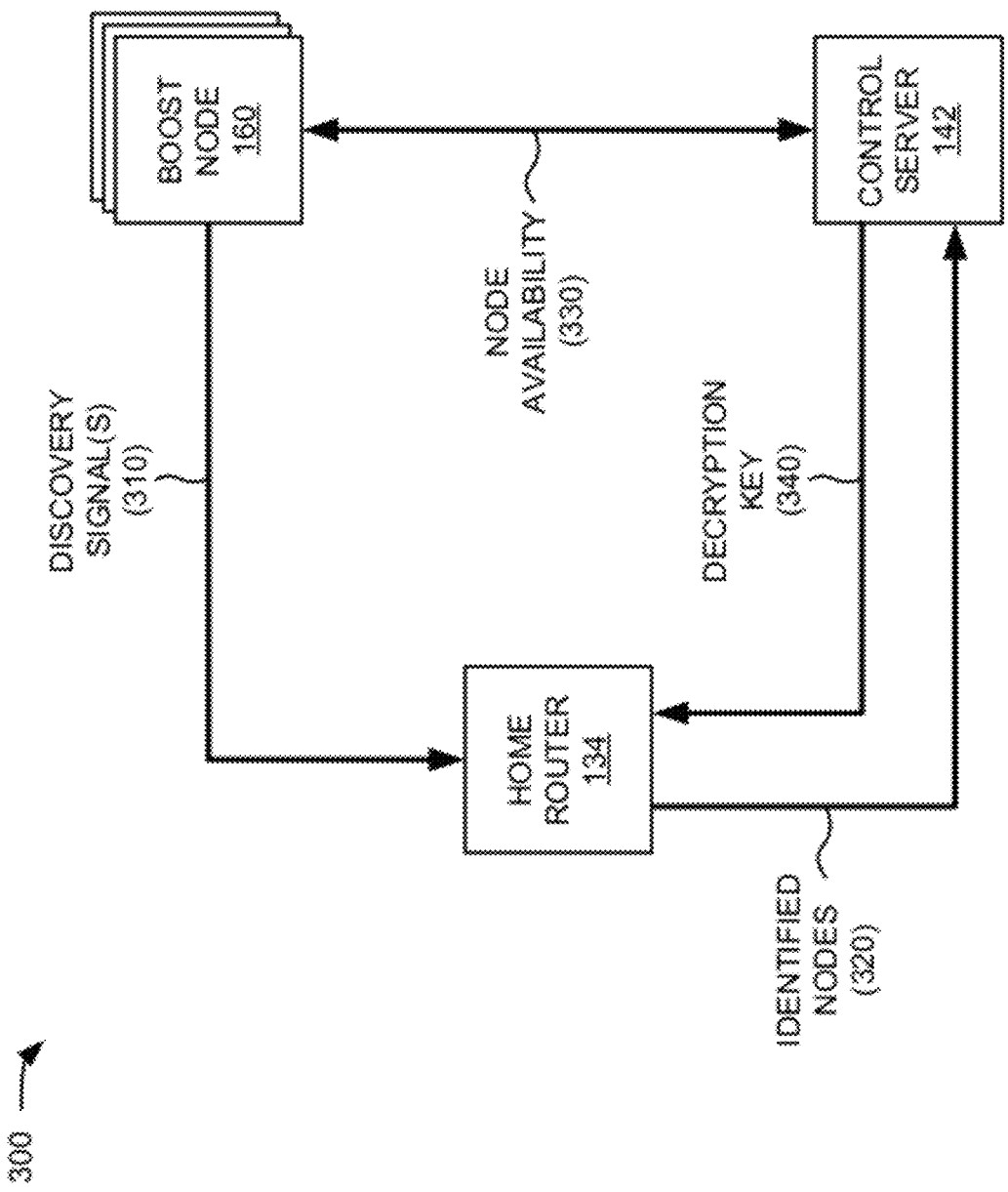
FIG. 3 is a diagram of example operations capable of being performed by an example network portion of the environment depicted in FIG. 1.

FIG. 3 is a diagram of example operations capable of being performed by a network portion 300 of environment 100 to register one or more boost nodes. As shown, network portion 300 may include home router 134, control server 140, and one or more boost nodes 160. Home router 134, control server 140, and boost nodes 160 may include the features described above in connection with one or more of FIGS. 1 and 2.

As further shown in FIG. 3, home router 134 may receive a discovery signal 310 from each boost node 160 to allow home router 134 to identify potential boost nodes. In one implementation, discovery signal 130 from some or all of boost nodes 160 may include proprietary protocols to identify boost node 160 as being associated with the same service provider for purposes of enabling home router 134 to receive a one-way (e.g., downlink) signal from the boost node. Additionally, or alternatively, discovery signal 130 from some or all of boost nodes 160 may include conventional protocols to enable a two-way WiFi interface.

Based on one or more discovery signals 130, home router 134 may compile a list of identified boost nodes 160 and send the list of identified boost nodes 160 to control server 140, as indicated by reference number 320. The list of identified boost nodes 160 may include, for example, boost nodes 160 with which home router 134 has established a pre-association for a one-way (e.g., downlink) data transfer and/or boost nodes 160 with which home router 134 has successfully completed a two-way handshake to enable a WiFi session.

Control server 140 may receive the list of identified nodes 320 from home router 134. Based on the list of identified nodes 320, control server 140 may monitor the availability of boost nodes 160 in real time. For example, node availability signals 330 may be exchanged between control server 140 and each of boost nodes 160 to monitor availability and/or capacity of boost nodes 160. Availability and/or capacity information may include, for example, an indication of whether a dedicated boost node is serving other customers, an indication of whether a private access point with boost node capabilities is being used by a primary customer, a total available bandwidth, a currently used bandwidth, and/or an amount of bandwidth available to other customers (e.g., home router 134). In one implementation (e.g., where a boost node 160 is not associated with the same service provider as that of home router 134), node availability signals 330 may not be exchanged between control server 140 and boost node 160.

In one implementation, control server 140 may provide a decryption key 340 to home router 134. Decryption key 134 may include information to enable home router to decrypt content sent via a one-way (e.g., downlink) path from boost node 160.

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

Figure 4:
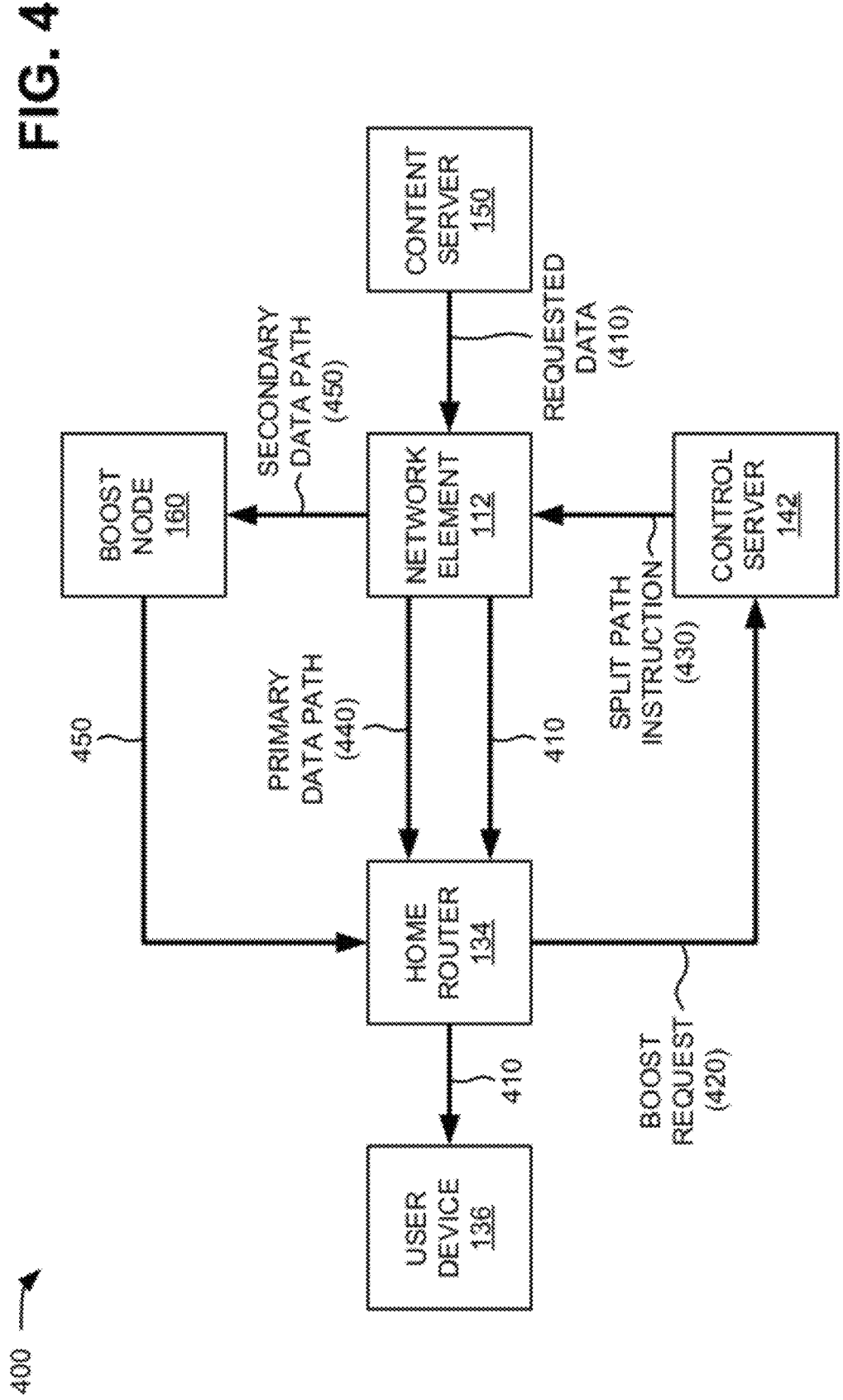
FIG. 4 is a diagram of example operations capable of being performed by another example network portion of the environment depicted in FIG. 1.

FIG. 4 is diagram of example operations capable of being performed by another network portion 400 of environment 100. The operations shown in FIG. 4 may represent a supplemental bandwidth request initiated by a home router. As shown, network portion 400 may include network element 112, home router 134, user device 136, control server 140, content server 150, and boost node 160. Network element 112, home router 134, user device 136, control server 140, content server 150, and boost node 160 may include the features described above in connection with one or more of FIGS. 1-3.

As further shown in FIG. 4, content server 150, based on a previous request (not shown) from user device 136, may send requested data 410 toward user device 136. Requested data 410 may include, for example, a high bandwidth data flow, such as streaming video, an on-line game, a large file download, etc. Requested data 410 may pass through network element 112 to home router 134 (e.g., via central office 120, not shown).

Home router 134 may detect high bandwidth usage (e.g., bandwidth at or approaching the available bandwidth capacity of primary service line 124 of FIG. 1) while receiving requested data 410. In response to the detection of the high bandwidth usage, home router 134 may send a boost request 420 to control server 140 to request additional network bandwidth. Boost request 420 may include, for example, an identifier for home router 134 (e.g., an IP address, a serial number, etc.), source information for content server 150, TCP/IP session information, an estimated duration for the requested boost, a requested supplemental bandwidth amount, information about requested data 410, etc.

Control server 140 may receive boost request 420 from home router 134 (e.g., via network element(s) 112). Control server 140 may review the list of the previously identified boost nodes 160 (e.g., as included in the list of identified boost nodes 320 of FIG. 3) and determine if a boost node 160 is available for home router 134 (e.g., based on node availability signals 330 of FIG. 3). If a boost node 160 is available, control server 140 may provide a split-path instruction 430 to network element 112 (and/or other network elements of network 110) to route portions of the requested data 410 from content server 150 over separate paths.

Network element 112 may receive the split-path instruction and route requested data 410 to home router 134 over a primary path 440 and a secondary path 450. Primary data path 440 may go through the subscriber's primary service line (e.g., primary service line 124), while secondary data path 450 may go through boost node 160. In one implementation, network element 112 may encrypt data over the secondary data path 450. The amount of traffic distributed over primary data path 440 and secondary data path 450 may be determined by control server 140 based on one or more of a value included in boost request 420, an available bandwidth of primary data path 440, and available bandwidth of secondary data path 450, a subscription agreement, and/or other factors.

Home router 134 may receive requested data 410 via both primary data path 440 and secondary data path 450, may decrypt any encrypted data (e.g., from secondary data path 450), and may forward the data received via the two paths to user device 136 as requested data 410 via a single data stream. In one implementation, home router 134 may order traffic (e.g., packets) from primary data path 440 and secondary data path 450 to minimize dropped packets and/or other delays. For example, home router 134, network element 112, control server 140, and/or boost node 160 may implement a protocol to allow home router 134 to sort traffic from primary data path 440 and secondary data path 450 prior to passing the data to user device 136 as requested data 410.

As an example of the operations of network portion 400, assume requested data 410 includes a video stream with 4 megabits per second (Mbps) requirement for optimal viewing and further assume primary path 440 (e.g., primary service line 124) provides up to 3 Mbps. Upon receiving boost request 420, control server 140 may direct network element 112 to divide requested data 410 between primary data path 440 and secondary data path 450 such that 3 Mbps of the requested data 410 is transmitted over primary path 440 and 1 Mpbs of the requested data 410 is transmitted over secondary path 450.

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
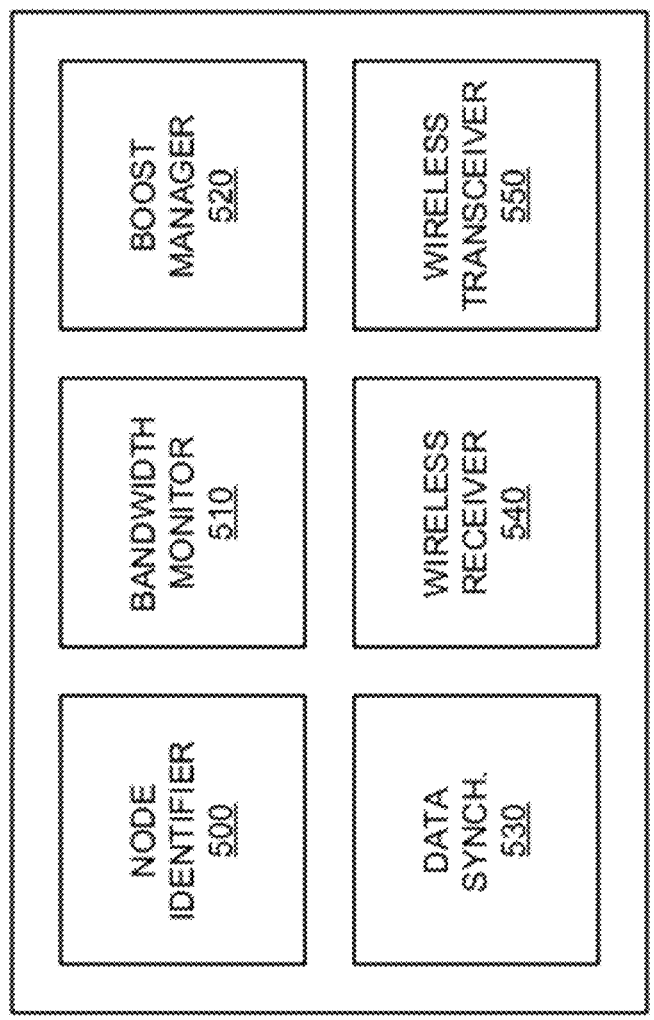
FIG. 5 is a diagram of example functional components of the home router depicted in FIG. 1.

FIG. 5 is a diagram of example functional components of home router 134. In one implementation, the function of components described in connection with FIG. 5 may be implemented by one or more components of device 200 illustrated in FIG. 2. Also, in other implementations, functional components described herein in connection with home router 134 may by distributed between home router 134 and user device 136 and/or exclusively included within user device 136. As shown in FIG. 5, home router 134 may include a node identifier 500, a bandwidth monitor 510, a boost manager 520, a data synchronizer 530, a wireless receiver 540, and a wireless transceiver 550.

Node identifier 500 may include hardware or a combination of hardware and software to detect potential nodes (e.g., boost nodes 160) that may be used for providing supplemental bandwidth capacity to home router 134. For example, node identifier 500 may detect discovery signals 310 (FIG. 3) for boost nodes 160 for a geographic area within signal range of home router 134. Based on the detected discovery signals, node identifier 500 may generate a list of potential boost nodes 160 for home router 134.

Bandwidth monitor 510 may include hardware or a combination of hardware and software to determine if traffic conditions exist that may benefit from a supplemental bandwidth capacity. For example, bandwidth monitor 510 may monitor traffic over primary service line 124 to determine if traffic conditions are above a particular usage threshold (e.g., 80% of basic DSL or broadband capacity). In one implementation, bandwidth monitor 510 may monitor incoming traffic conditions over a particular period of time. In another implementation, bandwidth monitor 510 may detect a particular traffic type (e.g., a video stream), based on packet header data, that may be indicative of a need for supplemental bandwidth capacity. Bandwidth monitor 510 may also monitor supplemented traffic from primary service line 124 (e.g., primary data path 440 of FIG. 4) and from boost node 160 (e.g., secondary data path 450 of FIG. 4) to determine if traffic conditions drop below a particular usage threshold (e.g., 80% of basic DSL or broadband capacity).

Boost manager 520 may include hardware or a combination of hardware and software to request and implement a supplemental bandwidth capacity for a home router (e.g., home router 134). In one implementation, boost manager 520 may send a boost request signal (e.g., boost request 420) to control server 140 based on, for example, indications from bandwidth monitor 510 that incoming traffic conditions are above a particular usage threshold. In another implementation, boost manager 520 may send a boost cancel request to control server when bandwidth monitor 510 indicates that supplemented incoming traffic drops below a particular usage threshold. Boost manager 520 may also combine data from boost node 160 (e.g., received via secondary data path 450 of FIG. 4) with data from primary service line 124 (e.g., received via primary data path 440 of FIG. 4). In another implementation, boost manager 520 may implement security features for data received from boost node 160, such as decryption based on a key (e.g., decryption key 340) received from control server 140 via primary service line 124.

Data synchronizer 530 may include hardware or a combination of hardware and software to order incoming traffic (e.g., packets) from primary data path 440 and secondary data path 450 to minimize dropped packets and/or other delays. For example, data synchronizer 530 may include protocols to manage flow/sequencing of data from boost node 160 (e.g., received via secondary data path 450 of FIG. 4) and data from primary service line 124 (e.g., received via primary data path 440 of FIG. 4). Thus, data synchronizer 530 may reduce sequencing/buffering requirements for user device 136.

Wireless receiver 540 may include hardware or a combination of hardware and software to process wireless signals from boost node 160. For example, wireless receiver 540 may perform de-modulation, de-interleaving, equalization, filtering, de-coding, channel estimation, estimations related to signal-to-noise (SN), estimations related to signal-to-interference-to-noise (SIN), estimations related to channel fading, error control, and/or other types of processing related to receiving wireless signals. Wireless receiver 540 may be capable of operating in, for example, one or more of a Frequency Division Multiple Access (FDMA) scheme, a Time Division Multiple Access (TDMA) scheme, a Code Division Multiple Access (CDMA) scheme, or a Wideband CDMA (WCDMA) scheme.

Wireless transceiver 550 may include hardware or a combination of hardware and software to send signals to and/or receive signals from user device 136. For example, wireless transceiver 550 may receive signals from boost manager 520, data synchronizer 530, and/or wireless receiver 540 and transmit the signals to user device 136 via a wireless interface.

Also, wireless transceiver 550 may receive signals from user device 136 via the wireless interface and provide the signals to, for example, boost manager 520, data synchronizer 530, and/or wireless receiver 540. Wireless transceiver 550 may perform modulation, interleaving, equalization, encoding, power control, error control, channel estimation, and/or other types of processing related to transmitting wireless signals. Wireless transceiver 550 may include, for example, a Multiple Input Multiple Output (MIMO) transceiver, a Single Input Multiple Output (SIMO) transceiver, a Multiple Input Single Output (MISO) transceiver, or some other type of wireless transceiver. Wireless transceiver 550 may be capable of operating in, for example, a FDMA scheme, a TDMA scheme, a CDMA scheme, and/or a WCDMA scheme.

Although FIG. 5 shows example functional components of home router 134, in other implementations, home router 134 may include fewer functional components, different functional components, differently arranged functional components, or additional functional components than depicted in FIG. 5. Alternatively, or additionally, one or more functional components of home router 134 may perform one or more other tasks described as being performed by one or more other functional components of home router 134.

Figure 6:
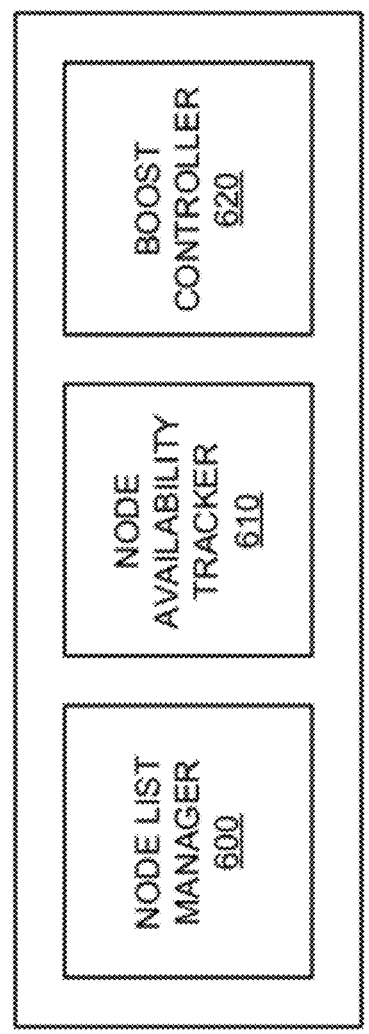
FIG. 6 is a diagram of example functional components of a control server depicted in FIG. 1.

FIG. 6 is a diagram of example functional components of control server 140. In one implementation, the function of components described in connection with FIG. 6 may be implemented by one or more components of device 200 (FIG. 2). As shown in FIG. 6, control server 140 may include a node list manager 600, a node availability tracker 610, and a boost controller 620.

Node list manager 600 may include hardware or a combination of hardware and software to match particular customer premises equipment (e.g., home router 134) with potential boost nodes (e.g., boost nodes 160). For example, node list manager 600 may receive (e.g., from node identifier 500) a list (e.g., list 320) of boost nodes 160 to associate with a particular home router 134. Node list manager 600 may store the list in a data structure (e.g., a database) to associate home router 134 with potential boost nodes 160. In one implementation, node list manager 600 may rank boost nodes 160 associated with home router 134 based, for example, on the type of node (e.g., a dedicated boost node, another subscriber's node, another carrier's node, etc.), available bandwidth capacity of the node, total bandwidth capacity of the node, network usage costs (e.g., associated with wireless data plan), and/or other factors. In one implementation, boost node rankings may be updated (e.g., in real time) based on, for example, changes in available bandwidth capacity of the node, changes in network usage costs (e.g., for time-based plans), and/or boost node connectivity to network 110.

Node availability tracker 610 may include hardware or a combination of hardware and software that may track real-time availability of potential boost nodes 160. In one implementation, node availability tracker 610 may receive availability indications (e.g., node availability signals 330 of FIG. 3) from potential boost nodes 160. An availability indication may include, for example, identifying an amount of unused bandwidth associated with a node, identifying if a node is being used (e.g., by a primary subscriber), and/or identifying a usage history for a particular period. In another implementation, node availability tracker 610 may solicit whether one or more particular nodes 160, associated with a particular home router 134, has available bandwidth. For example, node availability tracker 610 may solicit information about potential boost nodes 160 in response to a boost request from home router 134.

Boost controller 620 may include hardware or a combination of hardware and software to provide supplemental bandwidth capacity to a home router based on, for example, information from node list manager 600 and node availability tracker 610. Boost controller 620 may receive a boost request (e.g., boost request 420) and identify an available boost node 160 (e.g., from the list of potential boost nodes) associated with the requesting home router 134. In one implementation, boost controller 620 may select, for example, a highest ranked available boost node from the list of potential boost nodes.

Boost controller 620 may send, to one or more network elements 112, a signal to split a requested data stream (e.g., requested data 410) between a primary path (primary data path 440) and a secondary path (e.g., secondary data path 450). Boost controller 620 may, for example, provide load balancing instructions to divide the requested data stream between the primary path and the secondary path according to a determined percentage and/or bandwidth capacity of each path.

Boost controller 620 may also receive a boost cancel request and terminate split path routing to home router 134. In another implementation, boost controller 620 may also terminate split path routing if the available boost node (e.g., a particular boost node 160) becomes unavailable. In one implementation, when the available boost node becomes unavailable, boost controller 620 may automatically find an alternate boost node (e.g., based on information from node list manager 600 and node availability tracker 610).

Although FIG. 6 shows example functional components of control server 140, in other implementations, control server 140 may include fewer functional components, different functional components, differently arranged functional components, or additional functional components than depicted in FIG. 6. Alternatively, or additionally, one or more functional components of control server 140 may perform one or more other tasks described as being performed by one or more other functional components of control server 140.

FIG. 7 is diagram of example operations capable of being performed by another example portion 700 of environment 100. The operations in shown in FIG. 7 may represent a supplemental bandwidth request initiated by a user device. As shown, network portion 400 may include network element 112, home router 134, user device 136, control server 140, content server 150, and boost node 160. Network element 112, home router 134, user device 136, control server 140, content server 150, and boost node 160 may include the features described above in connection with one or more of FIGS. 1-6.

As further shown in FIG. 7, user device 136 may receive bandwidth data 710 from home router 134. Bandwidth data 710 may include, for example, an available bandwidth for primary services (e.g., over primary service line 124), bandwidth available from a boost node 160, current bandwidth usage (e.g., including use by other devices in subscriber premises 130), etc. User device 136 may generate a data request 720 for services from content server 150. Data request 720 may include, for example, a request for a high bandwidth data flow, such as streaming video, an on-line game, a large file download, etc. Data request 720 may pass through home router 720 and, for example, network element 112, to content server 150. Based on data request 720, content server 150 may send requested data 410 toward user device 136.

Based on bandwidth data 710 and/or a type of data request 720, user device 136 may, concurrently or at a later time, send a boost request 730 to control server 140 (e.g., via home router 134, central office 120, and network 110 (not all shown in FIG. 7)). For example, user device 136 may detect (e.g., at the time of sending data request 720) that a requested video stream requires more bandwidth than is currently available through primary service line 124. In another implementation, user device 136 may detect high bandwidth usage (e.g., bandwidth at or approaching the available bandwidth capacity of primary service line 124 of FIG. 1) after sending data request 720. In still another implementation, user device 136 may include a user interface (e.g., included, for example, within a subscriber's on-line service portal) to manually request a service boost. In this implementation, the manually-selected service boost may initiate boost request 730.

Boost request 730 may be received by control server 140 to request additional network bandwidth. Boost request 730 may include, for example, information about data request 720 and/or requested data 410 (e.g., an identifier for home router 134, source information for content server 150, TCP/IP session information, an estimated duration for the requested boost, a requested supplemental bandwidth amount, etc.). In response to boost request 730, control server 140 may review the list of the previously identified boost nodes 160 (e.g., as included in the list of identified boost nodes 320 of FIG. 3) and determine if a boost node 160 is available for home router 134 (e.g., based on node availability signals 330 of FIG. 3). If a boost node 160 is available, control server 140 may provide a split-path instruction 430 to network element 112 (and/or other network elements of network 110) to route portions of requested data 410 from content server 150 over separate paths.

Network element 112 may receive the split-path instruction and route requested data 410 to home router 134 over a primary path 440 and a secondary path 450. Primary data path 440 may go through the subscriber's primary service line (e.g., primary service line 124), while secondary data path 450 may go through boost node 160. In one implementation, network element 112 may encrypt data over the secondary data path 450. The amount of traffic distributed over primary data path 440 and secondary data path 450 may be determined by control server 140 based on one or more of a value included in boost request 420, an available bandwidth of primary data path 440, and available bandwidth of secondary data path 450, a subscription agreement, and/or other factors.

Home router 134 may receive requested data 410 via both primary data path 440 and secondary data path 450, may decrypt any encrypted data (e.g., from secondary data path 450), and may forward the data received via the two paths to user device 136. Alternatively, or additionally, user device 136 may perform decryption and/or data sequencing to enable presentation of requested data 410 (e.g., as received via primary data path 440 and secondary data path 450) to a user.

In the configuration of FIG. 7, user device 136 may provide boost request 730 before, during, or after sending data request 720. Thus, in one implementation, user device may initiate supplemental bandwidth capacity before experiencing high bandwidth usage (or a poor user experience) over primary service line 124.

Although FIG. 7 shows example components of network portion 700, in other implementations, network portion 700 may include fewer components, different components, differently arranged components, or additional components than depicted in FIG. 7. Alternatively, or additionally, one or more components of network portion 700 may perform one or more other tasks described as being performed by one or more other components of network portion 700. For example, in one implementation, boost node 160 may communicate directly with user device 136 (e.g., instead of home router 134) to provide a secondary data path, using, for example, a broadband wireless signal. In other implementations, both home router 134 and user device 136 may communicate with separate boost nodes 160 to receive supplemental bandwidth, such that three data paths (e.g., a primary path, a supplemental path to home router 134, and another supplemental path to user device 136) may be used.

FIG. 8 is a flow chart of an example process 800 for providing supplemental bandwidth for a dedicated network connection according to implementations described herein. In one implementation, process 800 may be performed by home router 134. In another implementation, some or all of process 800 may be performed by user device 136 and/or another device or group of devices, including or excluding home router 134.

As illustrated in FIG. 8, process 800 may include detecting one or more potential boost nodes (block 810) and sending a list of the potential boost nodes to a control server (block 820). For example, in implementations described above in connection with FIG. 3, home router 134 may detect a discovery signal 310 from each boost node 160 to allow home router 134 to identify potential boost nodes. In one implementation, discovery signals 130 from some or all of boost nodes 160 may include proprietary protocols to identify boost node 160 as being associated with the same service provider for purposes of enabling home router 134 to receive a one-way (e.g., downlink) signal from the boost node. Based on one or more discovery signals 130, home router 134 may compile a list of identified boost nodes 160 and send the list of identified boost nodes 160 to control server 140, as indicated by reference number 320. The list of identified boost nodes 160 may include, for example, boost nodes 160 with which home router 134 has established a pre-association for a one-way (e.g., downlink) data transfer and/or boost nodes 160 with which home router 134 has successfully completed a two-way handshake to enable a WiFi session.

Returning to FIG. 8, process 800 may include detecting high bandwidth usage of the primary data path (block 830) and sending a boost request to the control server (block 840). For example, in implementations described above in connection with FIG. 4, home router 134 may detect high bandwidth usage (e.g., bandwidth at or approaching the available bandwidth capacity of primary service line 124 of FIG. 1) while receiving requested data 410. In response to the detection of the high bandwidth usage, home router 134 may send a boost request 420 to control server 140 to request additional network bandwidth. Boost request 420 may include, for example, an identifier for home router 134 (e.g., an IP address, a serial number, etc.), source information for content server 150, TCP/IP session information, an estimated duration for the requested boost, a requested supplemental bandwidth amount, information about requested data 410, etc.).

As further shown in FIG. 8, process 800 may include receiving data over a primary data path and a secondary data path (block 850), and merging data from the primary data path and the secondary data path (block 860). For example, in implementations described above in connection with FIG. 4, home router 134 may receive requested data 410 via both primary data path 440 and secondary data path 450, may decrypt any encrypted data (e.g., from secondary data path 450), and may forward the data received via the two paths to user device 136 as requested data 410 via a single data stream. In one implementation, home router 134 may order traffic (e.g., packets) from primary data path 440 and secondary data path 450 to minimize dropped packets and/or other delays.

FIG. 9 is a flow chart of another example process 900 for providing supplemental bandwidth for a dedicated network connection according to implementations described herein. In one implementation, process 900 may be performed by control server 140. In another implementation, some or all of process 900 may be performed by another device or group of devices, including or excluding control server 140.

As illustrated in FIG. 9, process 900 may include receiving a list of potential boost nodes for a customer premises device (block 910) and monitoring real-time availability of the potential boost nodes (block 920). For example, in implementations described above in connection with FIG. 4, control server 140 may receive the list of identified nodes 320 from home router 134. Based on the list of identified nodes 320, control server 140 may monitor the availability of boost nodes 160 in real time. For example, node availability signals 330 may be exchanged between control server 140 and each of boost nodes 160 to monitor availability and/or capacity of boost nodes 160. Availability and/or capacity information may include, for example, an indication of whether a dedicated boost node is serving other customers, an indication of whether a private access point with boost node capabilities is being used by a primary customer, a total available bandwidth, a currently used bandwidth, and/or an amount of bandwidth available to other customers (e.g., home router 134).

Returning to FIG. 9 process 900 may include receiving a boost request from the customer premises device (block 930) and selecting an available boost node from the list of potential boost nodes (block 940). For example, in implementations described above in connection with FIG. 4, control server 140 may receive boost request 420 from home router 134 (e.g., via network element(s) 112). Control server 140 may review the list of the previously identified boost nodes 160 (e.g., as included in the list of identified boost nodes 320 of FIG. 3) and determine if a boost node 160 is available for home router 134 (e.g., based on node availability signals 330 of FIG. 3). In one implementation, control server 140 may select the highest ranking boost node 160 as determined by node list manager 600.

As further shown in FIG. 9, process 900 may include sending a split-path instruction to network element(s) to route data to the customer premises device via both a primary path, using a dedicated subscription network connection, and a secondary path, using the boost node (block 950). For example, in implementations described above in connection with FIG. 4, if boost node 160 is available, control server 140 may provide a split-path instruction 430 to network element 112 (and/or other network elements of network 110) to route portions of the requested data 410 from content server 150 over separate paths.

Systems and/or methods described herein may detect a potential boost node for providing supplemental bandwidth, in addition to a primary data path, to a subscriber device. The systems and/or methods may send, to a control server, an indication of the potential boost node. The systems and/or methods may request, via the primary data path, data from a content server and may detect high bandwidth usage of the primary data path. The systems and/or methods may send, to the control server and based on the detected high bandwidth usage, a boost request for supplemental bandwidth. The systems and/or methods may implement split-path instructions so that the subscriber device may receive a portion of the data via the primary data path and another portion of the data via the potential boost node.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    detecting, by a subscriber device, one or more potential boost nodes for providing supplemental bandwidth to the subscriber device;
    sending, by the subscriber device and to a control server, a list of the one or more potential boost nodes;
    requesting, by the subscriber device and via a primary data path, data from a content server;
    sending, by the subscriber device and to the control server, a request for supplemental bandwidth; and
    receiving, by the subscriber device, a portion of the requested data via the primary data path and another portion of the data from one of the one or more potential boost nodes via a secondary data path that differs from the primary data path.

2. The method of claim 1, further comprising:
    detecting, by the subscriber device, high bandwidth usage of the primary data path, where sending the request is based on the detecting the high bandwidth usage.

3. The method of claim 1, further comprising:
    merging the portion of the data received via the primary data path with the other portion of the data received via the secondary data path.

4. The method of claim 1, where the primary data path is a digital subscriber line (DSL) path, and where the secondary data path is a wireless path.

5. The method of claim 1, where the one or more potential boost nodes comprise one or more of:
    a dedicated wireless access point for providing supplemental bandwidth,
    another subscriber device, or
    a portable wireless device.

6. The method of claim 5, where the one or more potential boost nodes provide the supplemental bandwidth via a wireless network connection.

7. The method of claim 6, where the wireless network connection is a downlink connection.

8. The method of claim 1, where the other portion of the data received via the secondary data path is encrypted, and where a decryption key for the encrypted data is received via the primary data path.

9. The method of claim 1, where the request for supplemental bandwidth includes one or more of:
    an identifier for the subscriber device,
    an identifier for the content server,
    Transmission Control Protocol/Internet Protocol (TCP/IP) session information,
    an estimated duration for the request for supplemental bandwidth,
    a requested supplemental bandwidth amount, or
    information about the requested data from the content server.

10. A computing device-implemented method, comprising:
    receiving, by the computing device and from a subscriber device, a list of potential boost nodes for providing supplemental bandwidth to the subscriber device;
    monitoring, by the computing device, availability of the potential boost nodes;
    receiving, by the computing device and from the subscriber device, a request for supplemental bandwidth;
    selecting, by the computing device and based on the monitoring, an available node from the list of potential boost nodes; and
    sending, by the computing device and to a network device, split-path instructions to:
        route a portion of data from a content server to the subscriber device via a primary data path associated with the subscriber device, and
        route a different portion of the data from the content server to the subscriber device via the selected available node via a secondary data path that differs from the primary data path.

11. The computing device-implemented method of claim 10, where monitoring the availability of the potential boost nodes includes identifying real-time bandwidth usage of each of the potential boost nodes.

12. The computing device-implemented method of claim 10, where selecting an available boost node from the list of potential boost nodes includes:
    ranking the potential boost nodes, from the list of potential boost nodes, based on one or more of:
        a type of the potential boost node,
        an available bandwidth capacity of the potential boost node,
        a total bandwidth capacity of the potential boost node, or
        network usage costs for the subscriber device; and
    selecting a highest ranked potential boost node.

13. The computing device-implemented method of claim 10, further comprising:
    sending, by the computing device and via the primary data path, a decryption key to enable the subscriber device to decrypt the different portion of the data from the selected available node.

14. The computing device-implemented method of claim 10, where the request for supplemental bandwidth includes one or more of:
    an identifier for the subscriber device,
    an identifier for the content server,
    Transmission Control Protocol/Internet Protocol (TCP/IP) session information, an estimated duration for the request for supplemental bandwidth, a requested supplemental bandwidth amount, or information about the requested data from the content server.

15. A subscriber device, comprising:

a memory to store a plurality of instructions; and a processor to execute instructions in the memory to:

detect a potential boost node for providing supplemental bandwidth to the subscriber device, send, to a control server, an indication of the potential boost node, request, via a primary data path, data from a content server, detect high bandwidth usage of the primary data path, send, to the control server and based on the detected high bandwidth usage, a request for supplemental bandwidth, and receive a portion of the data via the primary data path and another portion of the data from the potential boost node via a secondary data path that differs from the primary data path.

16. The subscriber device of claim 15, where the primary data path is a digital subscriber line (DSL) and where the secondary data path is a wireless data path.

17. The subscriber device of claim 16, where the other portion of the data is encrypted, and where the processor is further to execute instructions in the memory to:

receive, via the primary data path, a decryption key for the encrypted data, and decrypt the other portion of the data received from the potential boost node.

18. The subscriber device of claim 15, where the subscriber device includes one of:

a home router, a personal computer, a laptop computer, a Voice over IP (VoIP) device, a personal communications system (PCS) terminal, a personal digital assistant (PDA), a smart phone, or a gaming system.

19. A server device, comprising:

a memory to store a plurality of instructions; and a processor to execute instructions in the memory to:

receive, from a subscriber device, a list of potential boost nodes for providing supplemental bandwidth to the subscriber device, monitor availability of the potential boost nodes, receive, from the subscriber device, a request for supplemental bandwidth, select, based on the monitoring, an available node from the list of potential boost nodes; and send, to a network device, a split-path instruction to:

route a portion of data from a content server to the subscriber device via a wired data path associated with the subscriber device, and route a different portion of the data from the content server to the subscriber device via the selected available node along a wireless data path.

20. The device of claim 19, where the available node is one of:

a WiFi router, a wireless access point, a wireless adapter, a base station, or a wireless broadband unit.

21. The device of claim 19, where the other portion of the data is encrypted, and where the processor is further to execute instructions in the memory to:

send, to the subscriber device and via the primary data path, a decryption key for the encrypted data.

22. The device of claim 19, where, when selecting the available node from the list of potential boost nodes, the processor is further to execute instructions in the memory to:

rank the available nodes, and select a highest ranked available node from the list of potential boost nodes.

\* \* \* \* \*